Aug. 28, 1923.
W. G. WHITEHEAD
1,466,496
CLEANING DEVICE FOR CORN
Filed May 19, 1921
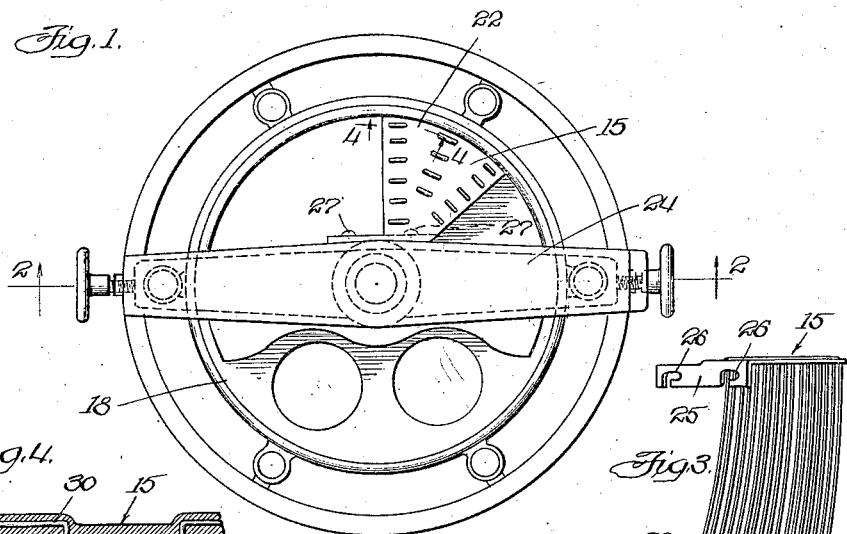
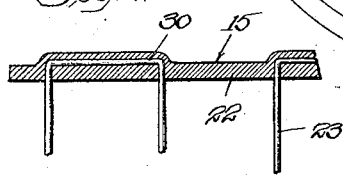
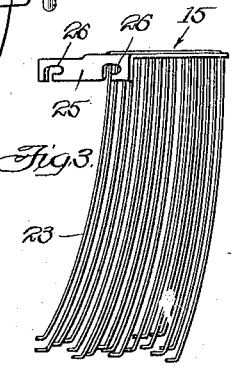
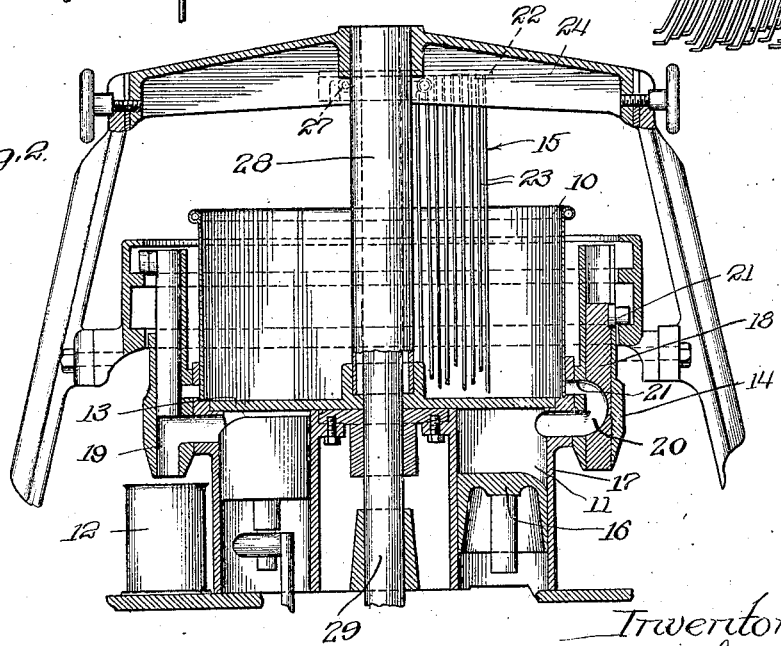
Inventor:
Will G. Whitehead Patented Aug. 28, 1923.

1,466,496

UNITED STATES PATENT OFFICE.

WILL G. WHITEHEAD, OF GIBSON CITY, ILLINOIS.

CLEANING DEVICE FOR CORN.

Application filed May 19, 1921. Serial No. 470,993.

*To all whom it may concern:*

Be it known that I, WILL G. WHITEHEAD, a citizen of the United States, residing at Gibson City, in the county of Ford and State of Illinois, have invented new and useful Improvements in Cleaning Devices for Corn, of which the following is a full, clear, concise, and exact description, reference being had to the accompanying drawing, forming a part of this specification.

My invention relates to a cleaning device for corn, and more particularly to a cleaning device for green corn which has been husked, cut from the cob, and cooked preparatory to filling.

One of the objects of my invention is to provide a device which will remove the pieces of husk, silk and cob, which are usually present to a greater or less extent in the corn as it comes to the filling machine. This foreign matter is usually present as it is practically impossible for the husker to remove all of the husk and silk, as some of the husk and silk will get lodged in between rows of corn, and will go along with the cut corn when the corn is removed from the cob by the cutting machine.

A further object of my invention is to provide a cleaning device which at the same time that it acts as a cleaner for removing pieces of husk, silk and cob, will also act as a mixer or stirrer for the cooked corn just previous to its being filled in the cans.

Further objects will appear from the detailed description to follow, and from the appended claims.

In the drawings in which an embodiment of my invention is shown—

Fig. 1 is a top plan view of a filling machine provided with a cleaning and mixing device;

Fig. 2 is an axial section on the line 2—2 of Fig. 1;

Fig. 3 is a side elevation of the cleaning and stirring comb; and

Fig. 4 is a section on the line 4—4 of Fig. 1, showing the way the teeth or fingers of the comb are secured.

In order to give a general idea of the construction it is here stated that this comprises a rotatable tank or reservoir 10, to which the cooked corn is supplied in any suitable manner, and which is kept approximately full of cooked corn, a series of pump devices 11, rotatable with the tank 10, for drawing the corn from the tank 10, and discharging it in the cans 12, which travel along with the pumps 11, a stationary cut-off plate 13 for controlling the passage of the corn from the rotatable tank 10 to the devices 11, a series of two-way valve devices 14, one for each pump device 11, for controlling the discharge from the pump devices 11, and a stationary cleaning and mixing comb 15 (Fig. 3) which is mounted so that its fingers extend down into a rotatable tank 10, and into the rotating mass of corn therein, and gather up the pieces of husk, silk and cob, and at the same time stir the cooked corn.

This cleaning and mixing comb 15 is so secured to the filling machine that it can be almost instantly detached, and cleaned, either by scraping or washing and again put in position in the filler.

The filling machine itself will not be described in detail. It will be sufficient to state that the pistons 16 of the pump devices 11 are controlled in their movement by a stationary cam so that they move downwardly to draw the corn into the cylinders 17, when the cylinders are in communication with the rotatable tank 10 through the opening 18 in the stationary cut-off plate 13. The two-way valve 18 of the valve devices 14 are controlled in their movement by a cam which causes them to be raised to permit the corn to be discharged from the cylinders 17 through the discharge nozzles 19 into the cans 12, when cans are present to be filled, and which causes these two-way valves 18 to be in their lowered position, shown at the right of Fig. 2, if no can is in position to be filled, so that the corn which may be in the cylinders 17 will then be forced back through the by-pass 20 in the two-way valve and passage 21, and back into the rotatable tank 10.

The sector-shaped plate 22 to which the teeth 23 of the cleaning comb are secured is itself detachably secured to the cross-arm 24 of the filling machine by a sort of bayonet joint connection, this sector-shaped plate having a down-turned flange 25 (Fig. 3) having a pair of L-shaped slots 26 therein, to receive the shanks of a pair of headed screws 27, which are secured to the cross-arm 24. The direction of these L-shaped slots 26 may be such that the movement of the mass of corn in the rotatable tank 10 will tend to hold the comb securely in position rather than to dislodge it.

To remove the comb for cleaning, etc., the plate 22 is simply slipped sidewise, and then lifted up, to free the screws 27 from the L-shaped slot 26. After the comb has been cleaned, it can be quickly put back into place, the removal and replacement being effected without stopping the machine if desired. To the cross-arm 24 is secured a sleeve 28 which supports the cut-off plate 13, this sleeve also having its upper end serving as a bearing for the drive shaft 29 which drives the rotatable tank 10.

The corn is also thoroughly mixed and stirred by the teeth 23 of the comb as it rotates along with the tank 10.

The teeth 23 of the comb may be formed of wire, two of the teeth being formed from a single piece of wire bent into a U-shaped form as shown in Fig. 4, the teeth being inserted through openings in the plate 22, and secured in place by soldering or brazing as indicated at 30, or the fingers may be cast in place in the plate 22. If desired, provision could be made for the attachment of another comb on the other side of the cross-arm 24 so that when it was desired to remove the comb for cleaning or the like another comb can be attached on the other side, while the first comb was being cleaned, in case it was desired to run the machine continuously, and not to permit any of the corn to pass to the cans without being subjected to the action of the comb.

It will be noted that the teeth are so arranged that they will cover substantially all of the material in the tank, as they extend almost to the bottom, and almost to the inner and outer confines of the tank.

Having thus described my invention, what I claim as new and desire to secure by Letters Patent of the United States is:

1. The combination with a corn filling machine comprising a rotatable tank, and means whereby corn is withdrawn from said tank and discharged into cans, of a stationary comb having teeth extending into said tank for gathering up the pieces of husk, silk, and other foreign material in the cooked corn, as the corn rotates with the tank.

2. The combination with a corn filling machine comprising a rotatable tank, and means whereby corn is withdrawn from said tank and discharged into cans, of a stationary comb having teeth extending into said tank for gathering up the pieces of husk, silk, and other foreign material in the cooked corn, as the corn rotates with the tank, and quick-detachable means for securing said comb in place.

3. The combination with a corn filling machine comprising a rotatable tank, means whereby corn is withdrawn from said tank as it rotates and discharged into cans, a rotatable shaft to which said tank is secured, a cross-arm above said tank having a bearing for said shaft, a stationary comb having teeth extending into said tank for gathering up the husk, silk, and other foreign material in the coked corn as it revolves in said tank, and means for securing said comb to said cross-arm.

4. The combination with a corn filling machine comprising a rotatable tank, and means whereby corn is withdrawn from said tank and discharged into cans, of a stationary comb having teeth extending into said tank for gathering up the pieces of husk, silk, and other foreign material in the cooked corn, as the corn rotates with the tank, said teeth substantially covering the space from the top to bottom of said tank, and from the central portion to the outer portion.

5. The combination with a corn filling machine comprising a rotatable tank, and means whereby corn is withdrawn from said tank and discharged into cans, of a stationary comb having teeth extending into said tank for gathering up the pieces of husk, silk, and other foreign material in the cooked corn, as the corn rotates with the tank, said comb comprising a substantially horizontal plate, and a plurality of teeth extending downwardly therefrom.

In witness whereof, I have hereunto subscribed my name.

WILL G. WHITEHEAD.